Jan. 31, 1967   J. A. HUBENY   3,301,100
BROKEN PART DETECTOR AND MACHINE CONTROL
Filed Oct. 5, 1964   3 Sheets-Sheet 1
FIG. 1
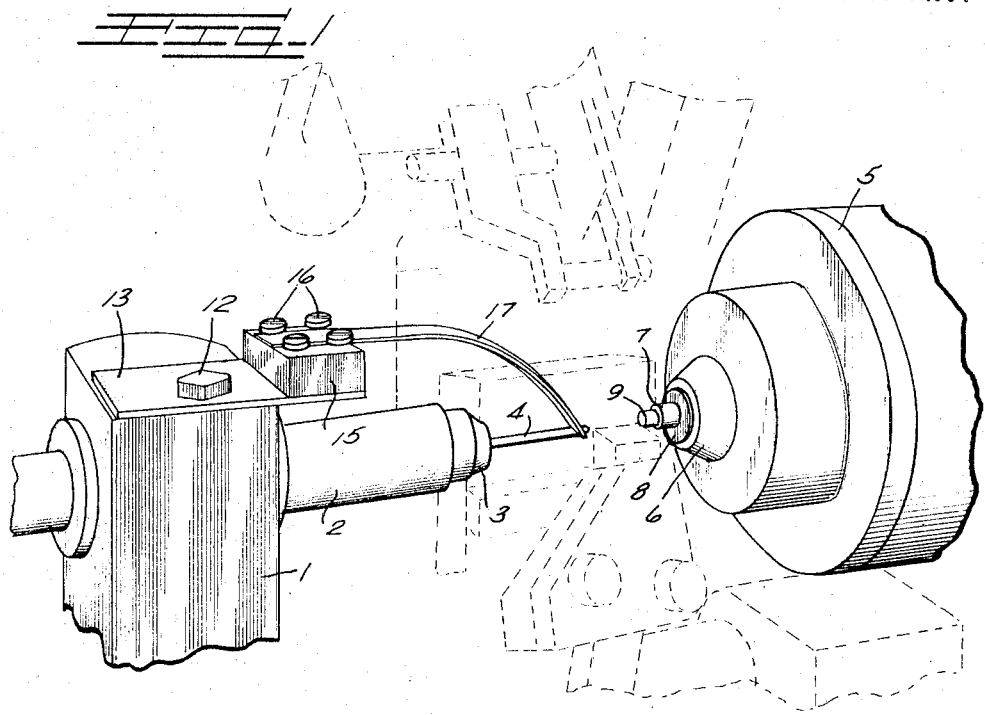
FIG. 5
FIG. 6
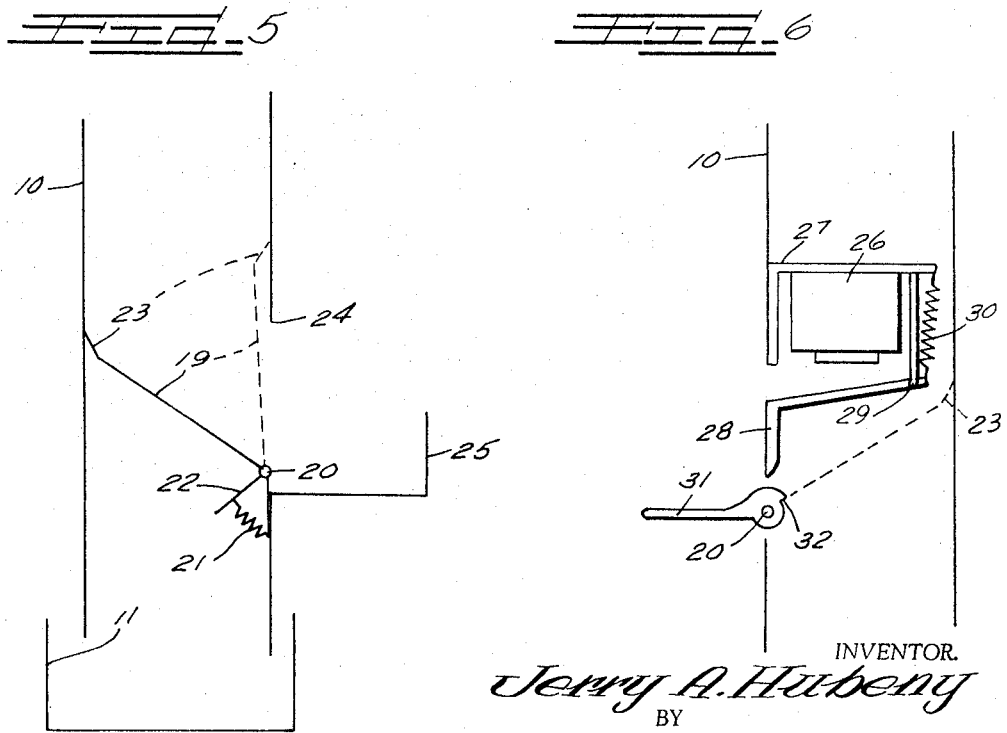
INVENTOR.
Jerry A. Hubeny
BY
Hill, Sherman, Meroni, Gross & Simpson
ATTORNEYS

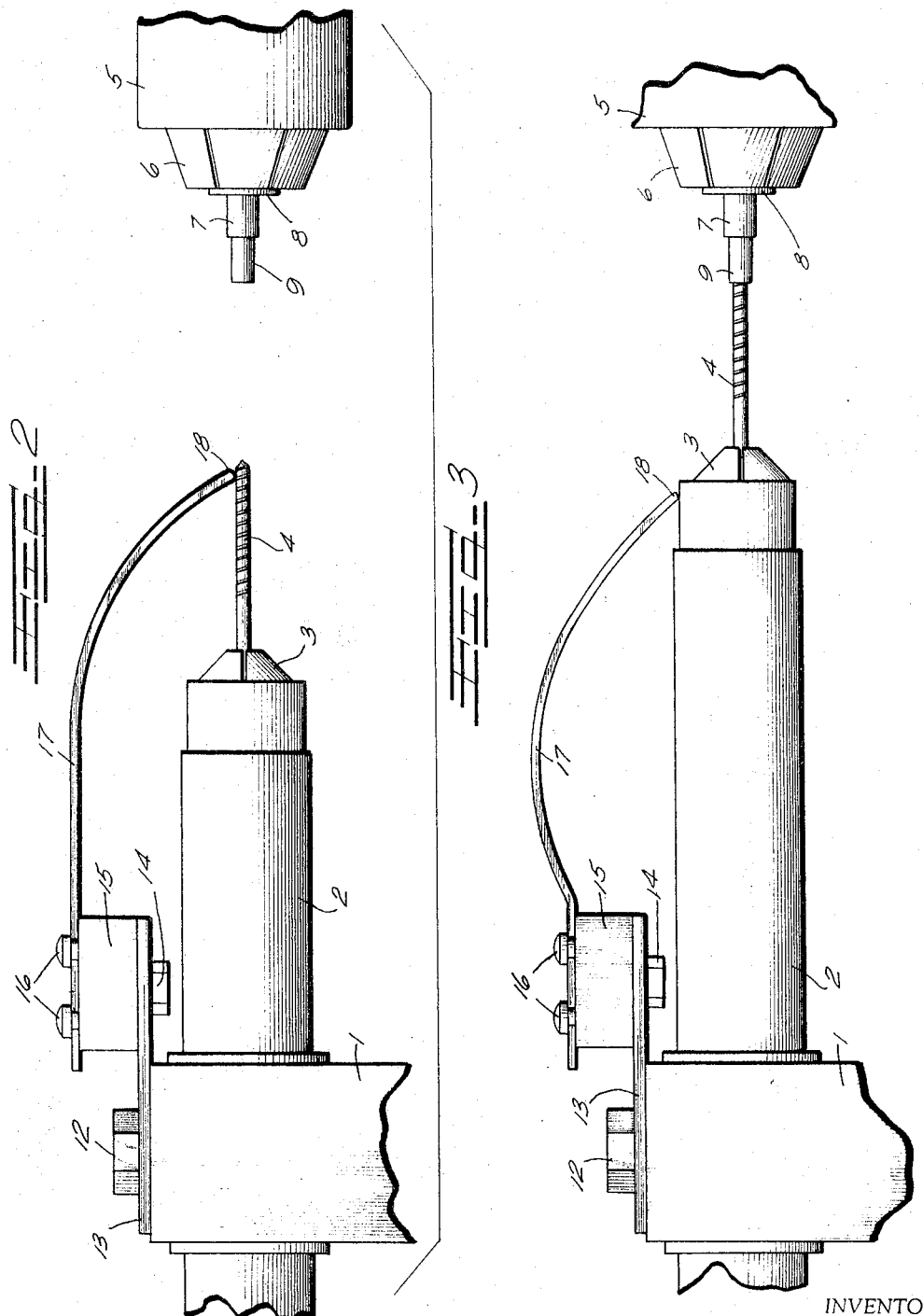

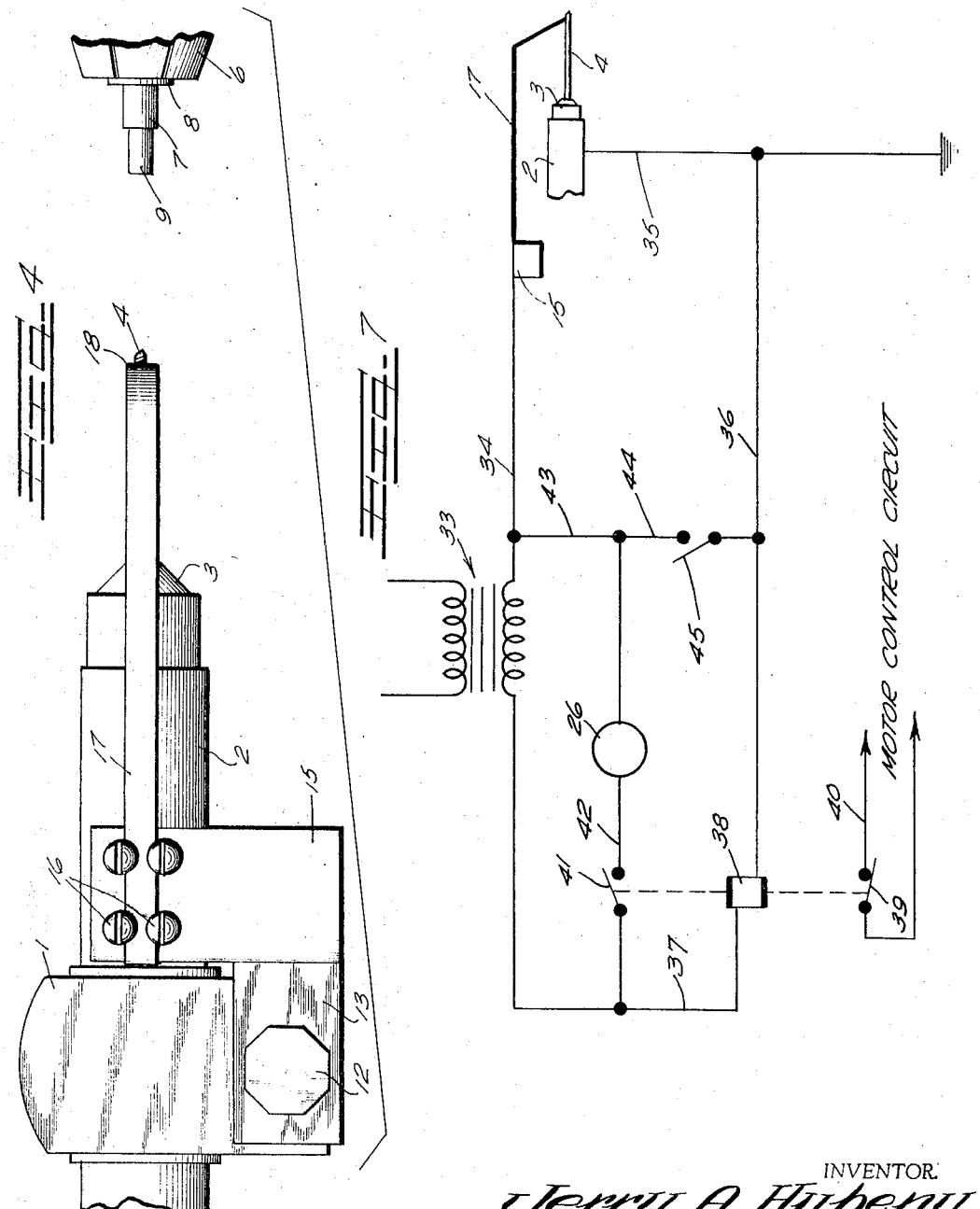

United States Patent Office 3,301,100
Patented Jan. 31, 1967

3,301,100
BROKEN PART DETECTOR AND MACHINE
CONTROL
Jerry A. Hubeny, 2229 S. Elmwood Ave.,
Berwyn, Ill. 60402
Filed Oct. 5, 1964, Ser. No. 401,561
8 Claims. (Cl. 77—5)

This invention relates to improvements in a broken part detector and machine control, the invention being highly desirable for use on machines of the lathe type, automatic screw machines, drilling machines, and various other types of machines wherein there is a movable tool holding chuck and a work holding chuck, the tool performing some operation upon the workpiece, the invention being capable of detecting a broken part, and automatically stopping the machine, although the invention may have other uses and purposes as will be apparent to one skilled in the art.

In the past, many and various forms of broken or missing part detectors have been developed for machines generally of the lathe type. However, such formerly known means for detecting and controlling operation of the machine took too much room for their installation for use on machines having only a two or three inch space between the tool and the workpiece, such as a small rivet finishing machine. In addition, many of these formerly known devices were objectionable in that the machine had to be dismantled or revamped in some respects in order to install the detecting device, and this fact coupled with the fact that most formerly known detecting assemblies were objectionably expensive to manufacture, rendered the use of the device in many instances prohibitively expensive.

With the foregoing in mind, it is an important object of the instant invention to provide a broken part detector and control for a machine that may be installed without dismantling the machine, and installed in an easy, rapid and economical manner.

It is also an important object of this invention to provide a detecting device of the character set forth herein that is inexpensive to manufacture, and which utilizes standard known parts, no specially designed equipment being necessary.

A further object of the instant invention is the provision of a detecting device of the character set forth herein which is incorporated in an electrical circuit along with means by which the device controls the operation of the drive motor, and the part to be immediately detected if it becomes broken is incorporated in the electrical circuit.

Still another object of this invention is the provision of a broken part detecting device that is simple to adjust, relatively trouble-free, always easily accessible, and which is economical to manufacture, install, and use.

While some of the more salient features, characteristics and advantages of the instant invention have been above pointed out, others will become apparent from the following disclosures, taken in conjunction with the accompanying drawings, in which:

FIGURE 1 is a fragmentary perspective view of a machine of known kind and operation equipped with detecting means embodying principles of the instant invention;

FIGURE 2 is a fragmentary side elevational view of the mechanically operating portion of the detecting means mounted on the machine;

FIGURE 3 is a view similar to FIGURE 2 but showing the detecting means in a different position;

FIGURE 4 is a fragmentary top plan view of the detecting means mounted on the machine;

FIGURE 5 is a fragmentary diagrammatic view illustrating the discharge chute of the machine equipped with means embodying principles of the instant invention;

FIGURE 6 is a view similar in character to FIGURE 5 showing the means of FIGURE 5 in rear elevation with respect to FIGURE 5; and FIGURE 7 is a fragmentary wiring diagram of the circuit involved in the use of the instant invention.

As shown on the drawings:

The illustrated embodiment of the instant invention is shown by way of example as mounted upon a machine of the lathe type for finishing small rivets by way of drilling a longitudinal hole partially through the rivet. Such machine is of known construction, and in FIGURE 1 the portions intimately associated with the instant invention are illustrated, with some of the machine background dotted. The salient parts of the machine with respect to this invention include an upstanding post 1 forming a part of the machine frame through the upper portion of which a shaft or spindle 2 may reciprocate. By way of suitable chuck means 3 the shaft 2 carries a drill 4 extending outwardly from the chuck. Opposite the drill 4 is a chuck support 5 carrying a work holding chuck 6. Either the shaft or the chuck 6 may be rotated while the other remains stationary in the usual operation of such a machine.

In the illustrated instance, the working holding chuck 6 carries a workpiece in the form of a small copper bronze rivet 7 having an intermediate circumferential flange 8 thereon and an outward portion 9 of reduced diameter. The machine by way of the drill 4 drills a longitudinal bore or hole in the rivet to a depth slightly exceeding the reduced portion 9. The showing in the drawing is exaggerated for purposes of clarity, the rivet being considerably smaller than the illustration. In operation, the shaft 2 carrying the drill moves from the position seen in FIGURE 2 to the position seen in FIGURE 3, drilling the hole in the rivet after contact therewith, and then recycles to the FIGURE 2 position during which time the finished rivet is ejected and an unfinished rivet automatically fed into the work holding chuck 6. The finished rivets are ejected into a chute 10 diagrammatically illustrated in FIGURES 5 and 6 which is mounted in any suitable location on the machine. The finished rivets fall through the chute and drop at random into any suitable form of container as indicated at 11. However, should the machine not be equipped with some form of detection means, and should the drill 4 break, one or more unfinished rivets would be discharged or ejected into the chute 10 and fall among the finished rivets in the container 11, before the broken drill would be discovered and the machine could be stopped. In that event, considerable time and tedious effort would be necessary to sort out the uncompleted rivets from the finished rivets in the container 11, and such effort might require hours before all of the defective rivets are located. Heretofore it was extremely difficult to put detection means upon a machine of the character shown, and especially one wherein the shaft 2 moves forwardly only a matter of two or three inches to complete an operation, there being only that much space between the end of the drill and the rivet to be acted upon.

The instant invention can be mounted upon a machine in an easy manner without dismantling the machine in any respect, and regardless of the distance between the tool and the workpiece. It is a simple expedient to drill and tap a hole in the top of the post 1 to one side of the shaft 2 to accommodate a bolt 12 which hold a mounting plate 13 in position on top of the post 1. Another bolt 14 extending through the mounting plate 13 securely holds a block 15 in position on the mounting plate. This block 15 is preferably made of fiber or other suitable insulating material. A plurality of headed bolts 16, four being shown in the illustrated instance, are threaded into the block 15 and hold the rear end of a feeler 17 securely in place and permit adjustment of that feeler relatively to the bolts or screws 16. The feeler 17 is in the form of a flat metallic spring capable of conducting electricity and having a downwardly turned end 18 which rides the drill 4 in its retracted position as seen best in FIGURE 2 and when the drill is fully advanced, the feeler point 18 may ride the chuck 3 holding the drill as indicated in FIGURE 3. Thus, the feeler maintains closed an electrical circuit which includes both the feeler and the drill 4 and its chuck 3, which electrical circuit, as more fully explained later, also includes control means governing the operation of the drive motor for the machine. Should the drill break, the circuit will be opened when the drill is in the retracted position of FIGURE 2 because of failure of the end 18 of the feeler to contact it, and the drive motor for the machine will be stopped. Upon opening of the motor circuit by way of a broken drill, the machine will close sufficiently to eject the unfinished rivet then in the work holding chuck 6.

Means have been provided to prevent the unfinished ejected rivet from entering into the container 11 at the base of the discharge chute 10. These means include a shutter 19 pivoted to the chute 10 as indicated at 20. A spring 21 having one end fixed to a flange 22 on the shutter and the other end attached to the chute at a suitable location tends to urge the shutter into the full line position seen in FIGURE 5, with an unturned lip 23 on the free end of the shutter bearing against the far wall of the chute. In this position the shutter will guide a defective rivet through an opening 24 in the wall of the chute and have that unfinished or defective rivet dropped into a container 25 mounted on the wall of the chute. On an outside wall of the chute a solenoid 26 is held in position on a suitable supporting bracket 27 attached to the chute. This solenoid acts upon a latching member 28 pivoted as at 29 and urged into latching position by a spring 30 connected to the bracket 27 at one end and at the other end to a portion of the latching member projecting beyond the pivot point, as clearly seen in FIGURE 6. Fixedly secured to the pivot rod 20 is a reset lever 31 having a sear 32 thereon for engagement with the latching member 28. When this reset lever is pushed downwardly for engagement with the latching member, it will move the shutter 19 which is fixed to the pivot shaft 20 to the dotted line position of FIGURE 5 where the shutter closes off the opening 24 in the chute and permits finished rivets to again be ejected down the chute into the container 11. Should the drill 4 break and the machine be stopped as above explained, the opening of the circuit by way of the broken drill will cause energzation of the solenoid 26, thereby drawing up the latching member 28, and releasing the shutter to be acted upon by the spring 21 and moved into rivet deflecting position as shown by the full lines in FIGURE 5. That operation will occur while the machine coasts sufficiently to eject the unfinished rivet so that the rivet will not be mixed up among the finished rivets in the container 11 but will be discharged by itself in the container 25. Consequently there is no need to waste time and effort tediously searching through the finished rivets for a bad or unfinished rivet.

In FIGURE 7 I have illustrated an electrical circuit which enables the feeler 17 to control the operation of the drive motor for the machine. A transformer 33 is connected to a suitable source of power and steps down the voltage to approximately 24 volts which is safe to an operator even though he may get his hands in the circuit. The transformer 33 feeds a conductor 34 which is connected to the aforesaid feeler 17. As long as the feeler contacts the drill, the drill chuck, or any portion of the shaft 2, the circuit is closed by way of the machine being grounded as indicated at 35. As long as the drill 4 is not broken, the feeler through conductors 34, 35, 36 and 37, the latter two being connected to the terminals of a relay 38, maintains the relay 38 energized. This relay, when energized, maintains a switch 39 closed in the motor control circuit 40. At the same time, the relay, when energized maintains a switch 41 open, this switch controlling a circuit through the aforesaid solenoid 26 by way of conductors 42 and 43 connected to conductors 34 and 37 across the output side of the transformer 33.

In operation, the instant invention is extremely simple and positive. If the drill 4 breaks, the electrical circuit is automatically opened, denergizing the realy 38 and causing the relay to open switch 39 and break the circuit to the drive motor of the machine. At the same time the relay effects a closing of the switch 41 through the solenoid 26 thereby unlatching the shutter 19 in the discharge chute 10 and permitting it to assume the full line position shown in FIGURE 5 to discharge an unfinished rivet ejected by the coasting of the machine after the breaking of the motor circuit into the auxiliary container 25. In this manner, an unfinished rivet is automatically kept out of the container 11 for the finished rivets. Upon replacement of the broken drill with a new one, the circuit is again closed and the machine resumes operation.

A cross-connection by way of conductor 44 is provided between the conductors 43 and 36, which cross-connection embodies a normally open switch 45 is provided for the operation of the machine without the use of the detecting means, if so desired.

From the foregoing, it is apparent that I have provided a novel broken part detection assembly which is extremely easily attached to a machine without dismantling the machine, which is economical to manufacture and use, and which is positive in action. Not only can the instant invention be used with a number of types of machines as will be apparent to one skilled in the art, but it can readily be mounted upon a machine regardless of the shortness of the distance between the tool and the workpiece.

It will be understood that modifications and variations may be effected without departing from the scope of the novel concepts of the present invention.

I claim as my invention:

1. In a machine of the lathe type having a workholding chuck, a reciprocatory tool, and a drive motor,
   an electrically conductive feeler to ride the tool, and maintain electrical contact therewith during normal operation of the machine, and
   an electric circuit including said feeler, the tool and the motor,
   whereby if the tool is broken the motor circuit is opened.

2. In a machine of the lathe type having a workholding chuck, a reciprocatory tool, a drive motor and means defining a path for discharged workpieces,
   an electrically conductive feeler to ride the tool,
   a shutter operable to by-pass workpieces from said path,
   an electrical circuit including said feeler, the tool and the motor, and
   means in said circuit operable upon the opening of the circuit to move said shutter to by-passing position.

3. Broken tool detection and motor control means for a machine having workpiece holding means, a tool to act on the workpieces, and a drive motor,
   an electrically conductive feeler to contact the tool and maintain electrical contact therewith during normal operation of the machine,
   an electric circuit including said feeler, the tool, and motor control means, and
   relay means in said circuit normally energized to maintain energization of the motor control means,
   whereby if the tool is broken the circuit is opened between the feeler and tool causing deenergization of the relay means and motor control means.

4. Broken tool detection and motor control means for a machine having workpiece holding means, a tool to act on the workpieces, and a drive motor, an electrically conductive flat spring feeler with an end thereof positioned to ride the tool and maintain electrical contact therewith during normal operation of the machine, a mounting plate secured to the machine, an insulating block on said plate and to which the opposite end portion of the feeler is secured, and an electrical circuit including the feeler, the tool, and motor control means, whereby if the tool is broken the circuit to the motor control means is opened.

5. Broken tool detection and motor control means for a machine having workpiece holding means, a tool to act on the workpieces, and a drive motor, an electrically conductive flat spring feeler with an end thereof positioned to ride the tool, a mounting plate secured to the machine, an insulating block on said plate and to which the opposite end portion of the feeler is secured, a chute through which finished workpieces are discharged, by-pass means associated with said chute to by-pass unfinished workpieces, electrical by-pass actuating means normally deenergized, an electrical circuit including the feeler, the tool, and motor control means, and means in said circuit to energize said by-pass actuating means upon breaking of the circuit between the feeler and the tool.

6. Broken tool detection and motor control means for a machine having workpiece holding means, a tool to act on the workpieces, and a drive motor, an electrically conductive flat spring feeler with an end thereof positioned to ride the tool, a mounting plate secured to the machine, an insulating block on said plate and to which the opposite end portion of the feeler is secured, a chute through which finished workpieces are discharged, by-pass means associated with said chute to by-pass unfinished workpieces, electrical by-pass actuating means normally deenergized, an electrical circuit including the feeler, the tool, and motor control means, and means in said circuit to energize said by-pass actuating means upon breaking of the circuit between the feeler and the tool, the last said means being in the form of a relay which when deenergized opens the motor control means and closes the circuit through said by-pass actuating means.

7. In combination with a machine for finishing small rivets having a finishing tool, rivet holding means, and a drive motor, a resilient conductive element normally contacting said tool, and means connecting said element and tool in a circuit controlling the operation of the motor, whereby if the tool is broken the circuit is opened.

8. In combination with a machine for finishing small rivets having a finishing tool, rivet holding means, and a drive motor, a resilient conductive element normally contacting said tool, electrically actuated by-pass means for an unfinished rivet, an electrical circuit, and motor control means, and means connecting said element, the tool, the motor control means, and the by-pass means in said circuit in a manner to stop the motor and energize said by-pass means if the circuit is opened between the tool and said element.

References Cited by the Examiner
UNITED STATES PATENTS

| | | | |
|---|---|---|---|
| 1,935,979 | 11/1933 | Hubbard | 77—5.2 |
| 3,079,821 | 3/1963 | Von Zelewsky et al. | 77—5.2 |

FRANCIS S. HUSAR, *Primary Examiner.*